(No Model.) 2 Sheets—Sheet 2.
C. ANDERSON.
CLOSED CONDUIT ELECTRIC RAILWAY.
No. 555,488. Patented Mar. 3, 1896.
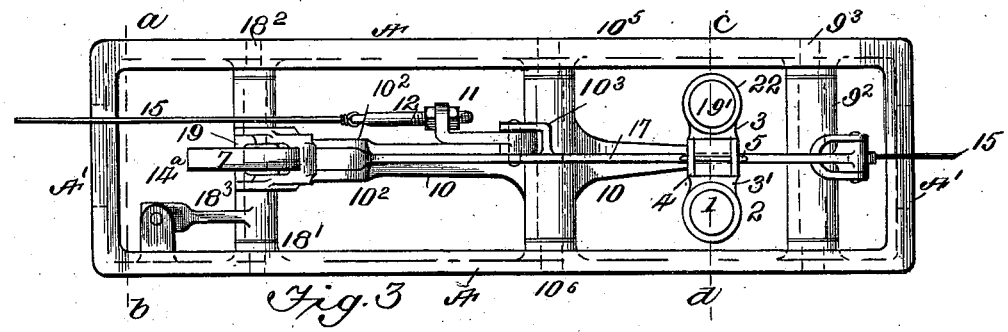
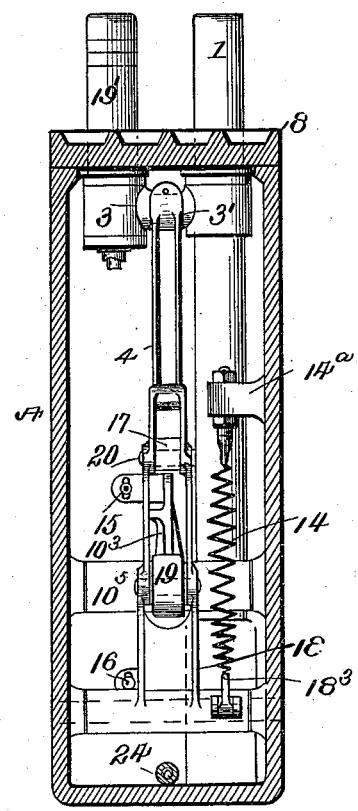
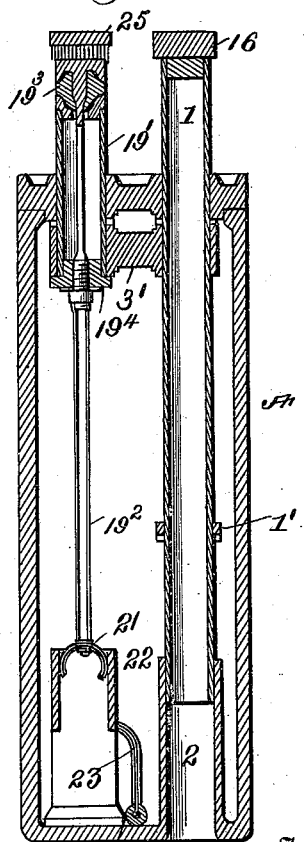
Witnesses
Geo. W. Rea,
Inventor
Chris Anderson
By James L. Norris.
Attorney

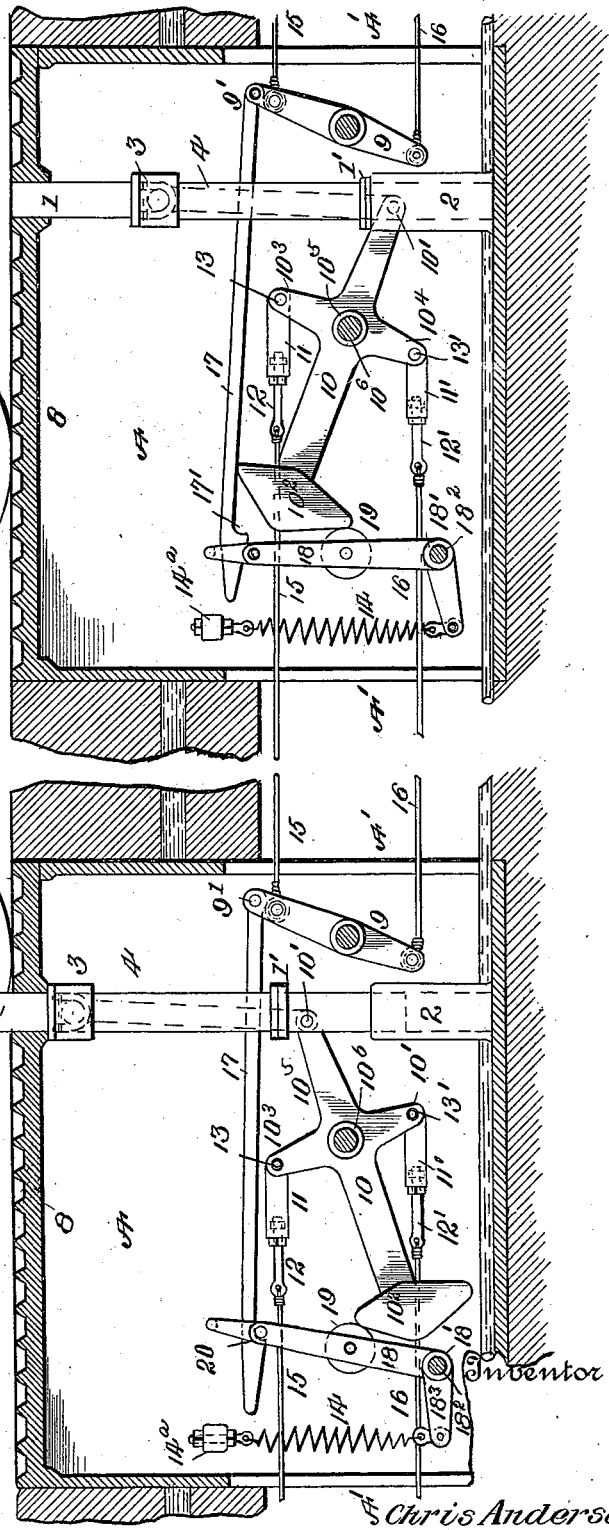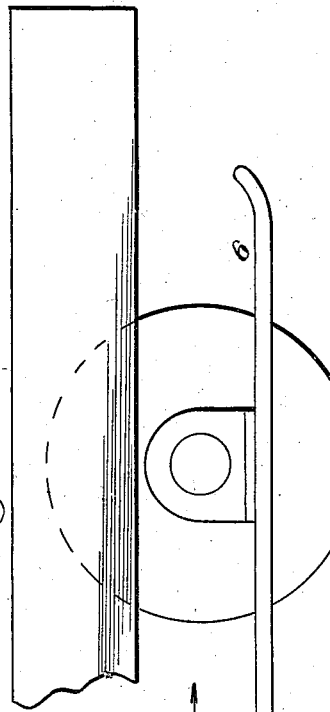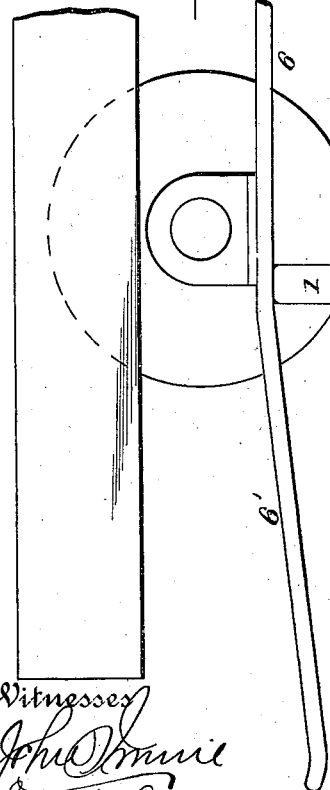

UNITED STATES PATENT OFFICE.

CHRIS ANDERSON, OF LEEDS, ENGLAND.

CLOSED-CONDUIT ELECTRIC RAILWAY.

SPECIFICATION forming part of Letters Patent No. 555,488, dated March 3, 1896.

Application filed February 13, 1895. Serial No. 538,284. (No model.) Patented in England July 13, 1894, No. 13,549.

*To all whom it may concern:*

Be it known that I, CHRIS ANDERSON, civil engineer, a subject of the Queen of Great Britain, residing at Lane House, Jack Lane Hunslet, in the city of Leeds, in the county of York, England, have invented certain new and useful Improvements in Apparatus for Working Electric Tramways by Means of Underground Cables, (for which I have obtained provisional protection in Great Britain, No. 13,549, bearing date July 13, 1894,) of which the following is a specification.

My invention relates to the operation of electric tramways from underground electric cables or conductors making connection with the car by means of vertically-movable pegs or bolts; and the invention consists in the features of construction and novel combinations of parts, as hereinafter described and claimed.

For the purposes of my invention herein described I place the pegs and accompanying operating mechanism in series of boxes sunk at intervals in the roadway with conduits between them, and I preferably employ two distinct sets of apparatus—that is to say, one set for each direction in which the cars are to be moved.

In the annexed drawings, illustrating the invention, Figure 1 is a vertical longitudinal section of my electric-tramway apparatus in the position of "peg up," also showing in elevation a part of a car-frame, one of the wheels of the car and the rear portion of the ramp. Fig. 2 is a similar view, but with the apparatus in the position of "peg down," and showing the front portion of the ramp instead of its rear end. Fig. 3 is a plan of the apparatus as sunk in the roadway and with the cover of the box taken off to expose the contained mechanism. Fig. 4 is a vertical cross-section on the line $c\,d$ of Fig. 3, showing a mechanical peg and a contact-peg and the manner of forming connection between the latter and the electrical conductor or cable, showing, also, in cross-section, the ramp and the contact-brush resting on the tops of the pegs, but omitting all other parts of the apparatus. Fig. 5 is a vertical cross-section on the line $a\,b$ of Fig. 3, showing more of the mechanism.

In the several figures the letter A designates one of the boxes sunk in the roadway to contain the peg mechanism, with the lower part of each box end cut away at A' to permit of a wire connection from box to box.

8 is the box-cover made detachable from the box. The mechanical peg 1 is guided at its upper end by a hole through the box-cover and at its lower end by a socket 2. This peg carries at its lower end a collar 1' so adjusted as to allow the peg to descend so far only as that its upper end shall be flush with the box-cover. The peg 1 has attached at its upper end a stud or cross-arm 3, and the opposite end of this cross-arm carries the contact-peg 19', which is not shown in Fig. 1 or 2, being hidden by the mechanical peg. The stud or cross-arm 3 is provided with a neck 3' for the purpose of being thereby connected with the link 4, Figs. 3 and 5, (shown by dotted lines in Figs. 1 and 2,) the lower end whereof is attached to the end 10' of the four-ended or cross-shaped lever 10, Figs. 1 and 2. The latter lever is arranged with a boss $10^5$, through which it is mounted on an axle $10^6$.

The longer end of the cross-shaped lever has a hammer-head $10^2$, that forms a double cam with unequal ends. The two upper and lower arms, $10^3$ and $10^4$, of the cross-shaped lever 10 carry pins 13 13', upon which are mounted links 11 and 11' connecting with tension-bolts 12 and 12', to which are attached two drag-wires 15 and 16, connecting with a double-ended lever 9 in the box next behind. The lever 9 has a hub $9^2$ mounted on an axle $9^3$, Fig. 3. The upper end of this double-ended lever 9 is made forked and carries a pin 9' on which is suspended a drag-rod 17, having near its opposite end a notch 17', Fig. 2, for the purpose of engaging with the catch-pin 20, Fig. 1, of the rocking lever 18. The lever 18 is formed with a boss 18', whereby it is mounted on an axle $18^2$, Fig. 3. It carries at its bottom end a short arm $18^3$, almost at right angles, the extreme end of which is connected to a helical spring 14 suspended from a lug $14^a$, Fig. 5, on the side of the box by means of a bolt and nuts. The spring 14 is of such power as to keep the long arm of the lever 18 always in contact with the hammerheaded end 10² of the cross-shaped lever 10, and to promote freedom of action the lever 18 carries a runner-wheel 19.

In Fig. 1 the mechanical peg 1 is shown up and in contact with the ramp 6 suspended from the tram-car and about to be depressed by the sloping tread-piece 6' of the ramp, and the drag-rod 17 is shown engaged with the catch-pin 20. As the tram-car pushes down the peg the cam 10² will rise and simultaneously push back the rocking lever 18, thereby pulling up the contact-peg 19' and mechanical peg 1 in the box next forward by means of the connections hereinbefore described, and this operation is assisted by the action of the runner-wheel 19 operating on the cam-head, as hereinbefore mentioned.

The lower end of the link 4 is connected with the cross-shaped lever 10 by a pivot-pin 10' and its upper end may be attached by a split pin 5, Fig. 3, to the cross-head 3' that connects the mechanical peg 1 and contact-peg 19', the relative arrangement of which is shown in Figs. 3 and 4. The contact-peg 19' has a depending rod 19², carrying on its lower end a bow-spring 21 sliding in a socket 22 at the bottom of the box A and thereby making electrical connection with the conductor or cable 24 through an intermediate connection 23 between the said socket and cable. The contact-peg 19' is provided with insulation at 19³ and 19⁴, as shown in Fig. 4.

After the contact-brush 25, carried by the car, has made connection with and passed over the elevated contact-peg 19' of one of the boxes A, the ramp 6 on the car will pass onto and depress the mechanical peg 1 of that box, thereby lowering, also, the connected contact-peg 19' and actuating the link 4 and connected lever mechanism, hereinbefore described, in such manner as to lift the pegs 1 and 19' in the next forward box, and so on, thus furnishing a continuous supply of electricity to the car-motor.

In the foregoing specification I have described my apparatus as employing a contact-peg separate from the mechanical peg; but one peg may be used for the double purpose.

To bring the automatic apparatus into action, it is necessary when a car is first started from the station or terminus to raise the first peg into contact by some suitable additional appliance or by hand. The same may also be necessary in case of accident to any peg in the course of a journey or where it is desired to back the car. There are many ways of doing this. The action required is first to raise a peg outside the length of the car and again depress it so as to raise the one under the car. At the station it may be done by means of a mechanical peg being prolonged to a suitable height above the floor-level and provided with a cross-head or other handle for the convenience of the operator in first pulling and then pushing. On a journey a different method must necessarily be used, but the nature of the operation is the same. I make no claim to any particular method, and I do not confine myself to any particular method of effecting the operation. If the place of operation be at some distance from a car, so that the first peg raised is outside the length of the car, then the peg so raised or any number of pegs consecutively raised may be pushed down by the foot until finally a peg is raised under the car.

To meet the case of a car getting off the track, the cars will carry a suitable length of spare cable capable of attachment to any contact-peg and so establish connection between the car and the cable below the roadway.

In an application, Serial No. 502,015, filed by me March 1, 1894, I have shown, described, and claimed the combination, with a series of vertically-movable contact-pegs adapted to complete the circuit beween a car-motor and an electric supply-cable, and peg-actuating mechanism arranged in a series of boxes together with said contact-pegs, of mechanical and positive means for elevating a peg in one box by the depression of a peg in the box next behind through suitable connections from box to box, and I have also therein claimed the combination, with an underground electric conductor, of vertically-movable contact-pegs adapted to complete the circuit between the said conductor and the car, a ramp carried beneath the car, and mechanism operated by said ramp for raising and depressing said pegs to make and break the circuit. In the said application the contact-pegs and mechanical pegs are shown as directly mounted upon and carried by rocking levers arranged in pairs and connected by rods with similar levers in adjacent boxes, and to provide for running a car both ways on the same line of track each contact-peg is accompanied by two mechanical pegs, and two ramps are provided on the car, one for each direction in which the car is to run. The construction, arrangement, and combination of devices shown in the aforesaid former application I do not herein claim; but

What I claim as my invention is—

1. In apparatus for operating electric railways from an underground electric supply-cable, the combination of a series of vertically-movable contact-pegs adapted to complete the circuit between the car-motor and said electric supply-cable, a series of vertically-movable mechanical pegs each provided with a stud or cross-arm that carries one of the contact-pegs, a series of boxes arranged at intervals for containing said pegs, lever mechanism located in each of said boxes, a link having its lower end connected to said lever mechanism and its upper end connected to the stud or cross-arm that connects a mechanical peg and a contact-peg, connections from the lever mechanism in each box to the similar lever mechanisms in adjacent boxes, and a ramp, carried beneath a car to engage a raised mechanical peg and cause the depression of the pegs in one box to elevate the pegs in the next forward box, substantially as described.

2. In apparatus for operating electric railways from an underground electric supply-cable, the combination of a series of vertically-movable contact-pegs and connected vertically-movable mechanical pegs, series of boxes arranged at intervals for containing said pegs, a cross-shaped lever 10 pivotally supported in each box and carrying a cam $10^2$ on one end, the lever 18 provided with arm $18^3$ and carrying a runner-wheel 19 and catch-pin 20, the link 4 connecting each pair of contact-pegs and mechanical pegs with one arm of the lever 10, a two-armed lever 9 in each box, a drag-rod 17 pivoted to one arm of the lever 9 and having a notch adapted to engage the catch-pin 20 of the lever 18, rods 15 and 16 connecting the two arms of lever 9 with upper and lower arms of a lever 10 in the next forward box, a spring 14 connected with arm $18^3$ of lever 18, and a ramp 6 carried by a car and adapted to engage and depress a raised mechanical peg, substantially as described.

CHRIS ANDERSON.

Witnesses:
 THO. DALTON,
 HERBERT L. P. LONDON.